Figure 1:
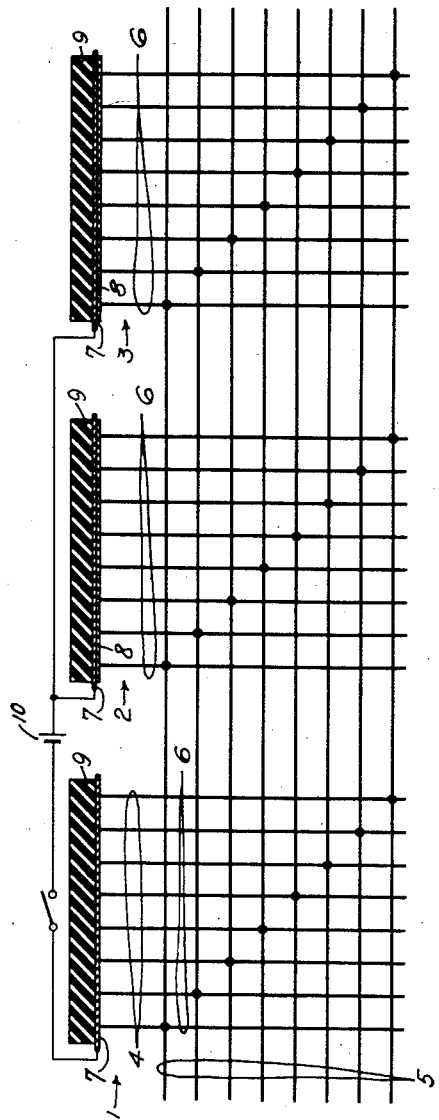

June 16, 1953  J. H. WILSON  2,642,481

MEANS AND METHOD FOR TESTING TERMINAL BANKS

Filed Sept. 23, 1949

INVENTOR
JAMES HAYNES WILSON
BY
ATTORNEY

Patented June 16, 1953

2,642,481

UNITED STATES PATENT OFFICE 2,642,481

MEANS AND METHOD FOR TESTING TERMINAL BANKS

James Haynes Wilson, Summit, N. J., assignor to International Standard Electric Corporation, New York, N. Y., a corporation of Delaware Application September 23, 1949, Serial No. 117,424

8 Claims. (Cl. 175—183)

This invention relates to method and arrangement for testing circuit conductivity and more particularly, for testing the circuit conductivity between a group of terminals and a group of lines to which the terminals are respectively connected.

In complex electric circuit systems involving multipled banks of terminals, such, for example, as automatic telephone systems, it is necessary at times to determine whether the welds between the multipled terminal leads and the lines to which they are multipled are intact. Generally, in such systems, the multiple terminals are more readily accessible than the multipled lines, because of the fact that in most systems in practice, the switch unit as a whole is removable, so that the multiple terminals are thereby exposed. Even so, it requires a great effort to make the aforesaid tests by working on individual terminals and this effort would be materially reduced by a method and apparatus that enabled a simultaneous test for conductivity of all the leads to a set of multipled bank terminals.

Accordingly, it is an object of my invention to provide a method and means for simultaneously testing the circuit conductivity between the respective lines of a plurality of groups of lines.

Another object is to make a record of the aforesaid test, in connection with the test and automatically as a result thereof.

Another object is a method and means whereby the aforesaid tests may be applied to banks of multiple terminals, which can easily be rendered accessible without the necessity of having access to the multipled conductors themselves and the welds made thereto.

Another object is to provide tests as aforesaid, which are applicable equally well to various types of terminal banks, such as flat or curved.

According to the invention there are provided two or more contact sheets or common conductor surfaces, one such sheet being applicable to each terminal bank so as to cover a group of, or all, the terminals thereof, there being inserted between the sheet and the terminals a layer of electro-sensitive recording material such as treated paper. Connections are made between one or more contact sheets in parallel and another contact sheet through a source of voltage. The application of said other sheet to the related multipled conductors, or preferably to another multipled bank, enables the color-marking of the sensitive layer as to all multiple circuit connections sufficiently intact to pass enough current therefor.

Figure 2:
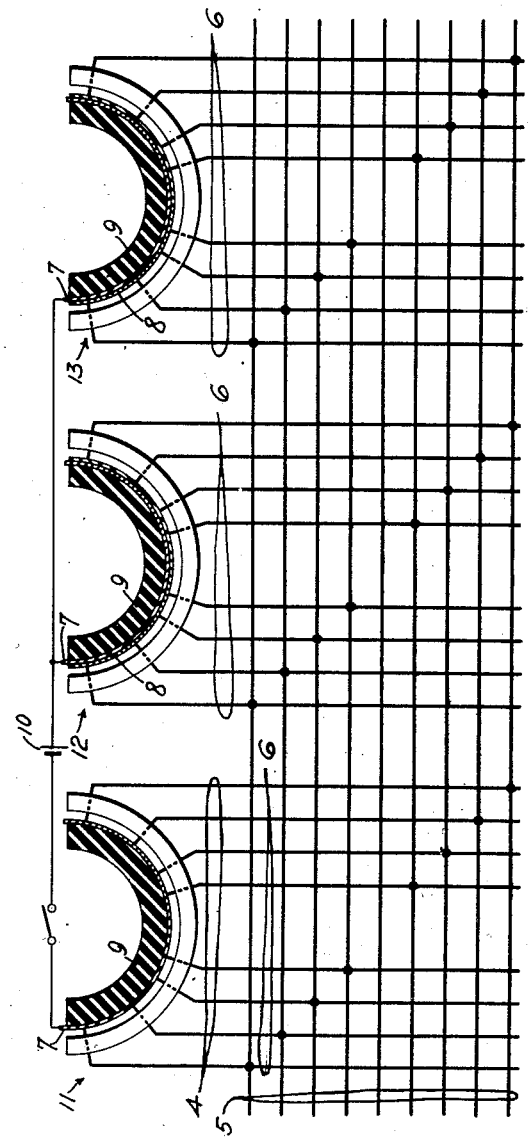

The foregoing and other objects and the invention itself will be better understood by reference to the following detailed description of embodiments of the invention taken in connection with the accompanying drawing in which:

Fig. 1 is a diagrammatic view partly in section of one arrangement of the invention as applied to terminal banks that are flat, and Fig. 2 is a similar view showing an application to curved banks.

Referring to Figure 1, three multiple terminal banks 1, 2 and 3 are shown. These are flat shaped and, as shown, are each composed of a single row of terminals 4, but it is understood that in most cases there will be a plurality of the rows of terminals. The horizontal lines 5 are the lines which are multipled at the banks and connected thereto by leads such as 6. To the surface of each terminal bank there is applied a contact sheet or conductor surface 7 such, for example, as a metallic film. At the banks under test there is applied between the terminals and the contact surface, an electro-sensitive paper or other sheet material 8 which undergoes a color-making at the points where electric current passes. Numerous types of such electro-sensitive material are known, as used for example in telegraphic recording and elsewhere. For the purposes of this invention such a one should be selected which is not rendered so conductive in operation at one point as to shunt operation at other points.

On the opposite side of the contact sheet is mounted a pressure pad 9, made of rubber or other suitable material. This may be held in position manually or by any other suitable means (not shown) to compress the electro-sensitive recording material between the terminals and the contact sheet.

The contact sheets of the terminal sets 2 and 3 under test are connected in parallel to one pole of a voltage source 10. The other pole is connected to the contact sheet which is applied to terminal set 1. As shown, this set does not have a sensitive recording sheet. Obviously, a terminal set such as 1 can readily be made accessible for this purpose by removing the cooperating switch. Of course, if the multipled lines 5 themselves were accessible and in proper form, the application of this contact surface could be made to them equally well.

In Figure 2, the terminal banks 11, 12 and 13 are curved in one direction and when composed of several rows the face of the bank will present a curved surface for cooperating with a set of circularly moving switch terminals. The elements of this embodiment of the invention and their relationship in other respects are the same as in case of Figure 1 and do not need further description.

The arrangement as described may be looked upon as a testing apparatus unit comprising as many of the contact sheets with their respective pressure pads as are deemed feasible together with the voltage source and the coupling connections therebetween as above described. Accordingly, in one operation, one of the contact sheets is applied to a bank of multipled terminals, or to the multiplied conductors jointed thereto, and the other contact sheet, or sheets, is applied to respective ones of the other multiple terminal banks whose connections are to be tested, each with an electro-sensitive record sheet interposed between the terminals and the contact sheet. At terminals having intact connections, current flow therethrough will produce a color-mark on the record sheet, the failure to make such a color being indicative of open connections. It is obvious that the degree of discoloration of the paper will vary with the amount of current which passes therethrough, thus rendering it possible to detect a high-resistance connection between terminal banks as distinguished from an open connection; a high resistance connection resulting in a slight discoloration, a normal connection resulting in a deep discoloration and an open circuit resulting in no marking whatever. It is therefore possible to ascertain any of the aforementioned three conditions in a single, simultaneous test.

Numerous variants from the particular procedures and uses as described above are obviously within the scope of the invention, such as tests for low insulation and for contacts between adjacent circuit conductors, and the foregoing particular description is not to be taken as limiting the claimed invention.

What is claimed is:

1. Apparatus for testing the conductivity between conductors of a first and a second group of conductors, the conductors of said second group terminating in adjacent, mutually insulated terminals, comprising a source of electrical potential having a pair of terminals of opposite polarity, electrically conducting means for connecting one of said source terminals simultaneously to the conductors of the first group, a member, a conductive surface on said member complementary to the surface formed by the terminals of the second group of conductors and connected to the other terminal of said source and a sheet interposed between said conducting surface and said terminals, said sheet being of a material permitting transverse current flow therethrough and adapted to permanently indicate the points of such current flow between the conductor terminals and said conducting surface.

2. Apparatus for testing the conductivity between conductors of a first group and conductors of a second group, conductors of said two groups being interconnected in a predetermined manner, and adjacent separated terminals terminating conductors of said second group, comprising a source of electric potential having a pair of terminals of opposite polarity, electrically conducting means for connecting one of said source terminals to a plurality of the conductors of said first group, a conducting member connected to the other of said source terminals adapted to contact said plurality of conductor terminals simultaneously, and a sheet material interposed between said conducting member and said conductor terminals, said material of a type becoming color-marked at the point of electrical discharge therethrough and adapted to indicate permanently the points of electrical discharges passed from said conductor terminals to said conducting member.

3. Apparatus according to claim 2, wherein said sheet material has low lateral conductivity compared to its transverse conductivity to prevent current flow between adjacent conductor terminals under test.

4. Device for testing conductivity between one bank of terminals and at least one other bank of terminals, each terminal of the first bank being connected by interconnected conductors to at least one terminal of said at least one other bank of terminals, comprising a source of electrical potential, having a pair of terminals of opposite polarity, conducting means connected to one of said source terminals and adapted to contact simultaneously all of the terminals of the first bank of terminals to electrically connect all of said last named terminals to said source, a conducting flexible contact member electrically connected to the other source terminal for each of said at least one other bank of terminals, means for forcing said flexible member into simultaneous engagement with all of the terminals of the associated bank of terminals, and electro-sensitive sheet material means interposed between said contact member and the terminals of the associated bank of terminals for providing a permanent record of an electrical discharge between particular terminals and associated contact sheet.

5. Device in accordance with claim 3 in which said conducting means connecting said first terminal source to said first bank of terminals comprises a flexible conducting sheet connected to said first source terminal and means for pressing said last named conducting sheet into simultaneous contact with all the terminals of said first bank.

6. The method of simultaneously testing the conductivity of a plurality of circuits having individual outlets which comprises the steps of connecting said circuits in common at points remote from said outlets, placing one side of a strip of current-sensitive material against said outlets, impressing a potential difference between said connected points and the other side of said strip to simultaneously graphically record the passage of the amount of current through said outlets, removing said strip, and disconnecting said common connection.

7. The method of simultaneously testing multipled connections between conductors and their multiple terminal sets comprising the steps of conductively connecting said conductors together and to one pole of a voltage source, applying a sheet of an electro-sensitive material having a color changing characteristic to the terminals of a multiple set, simultaneously connecting said last-mentioned terminals to the other pole of said source through said sheet to simultaneously graphically record upon said sheet the amount of current flowing through individual of said terminals, removing said sheet and disconnecting said conductors from said source.

8. The method of simultaneously testing the conductivity of a plurality of circuits having individual outlets which comprises the steps of connecting said circuits to a common junction at points remote from said outlets, bringing a unitary element of material having permanent current-indicating properties into electrically conductive engagement with each of said outlets, backing said element with a current conductive member maintained in contiguous engagement therewith, applying a potential difference between said common junction and said backing member to effect a current flow between each of said individual outlets through said material to said backing member to effect simultaneous permanent changes in the portions of said material adjacent said outlets as a permanent recording of the amount of such current flow, removing said backing member, removing said material and returning said circuits at said remote points to a non-junction condition.

JAMES HAYNES WILSON.

References Cited in the file of this patent

UNITED STATES PATENTS

| Number | Name | Date |
|---|---|---|
| 843,189 | Willis | Feb. 5, 1907 |
| 2,303,472 | Johnston | Dec. 1, 1942 |
| 2,433,332 | Benioff | Dec. 30, 1947 |
| 2,532,336 | Rufolo | Dec. 5, 1950 |